L. W. CHUBB.
MEASURING INSTRUMENT.
APPLICATION FILED APR. 3, 1914.

1,272,775.

Patented July 16, 1918.
2 SHEETS—SHEET 1.

WITNESSES:
F. A. Lind.
J. H. Procter.

INVENTOR
Lewis W. Chubb
BY
ATTORNEY

L. W. CHUBB.
MEASURING INSTRUMENT.
APPLICATION FILED APR. 3, 1914.

1,272,775.

Patented July 16, 1918.
2 SHEETS—SHEET 2.

WITNESSES:
F. A. Lind.
J. H. Procter

INVENTOR
Lewis W. Chubb
BY
Wiley G. Carr
ATTORNEY

UNITED STATES PATENT OFFICE.

LEWIS W. CHUBB, OF EDGEWOOD PARK, PENNSYLVANIA, ASSIGNOR TO WESTING-HOUSE ELECTRIC AND MANUFACTURING COMPANY, A CORPORATION OF PENN-SYLVANIA.

MEASURING INSTRUMENT.

1,272,775.  Specification of Letters Patent.  Patented July 16, 1918.

Application filed April 3, 1914. Serial No. 829,193.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Measuring Instruments, of which the following is a specification.

My invention relates to measuring instruments and particularly to potentiometers.

One object of my invention is to provide a potentiometer for measuring temperature variations of thermo-couples having such characteristics that their thermoelectromotive forces vary directly with changes in their temperatures.

Another object of my invention is to provide a potentiometer which may be calibrated without the use of a standard cell, by reason of the double use of a galvanometer embodied therein.

Heretofore, potentiometers which were used for measuring temperatures were complicated in their operation and occupied too large a space. In order to overcome the hereinbefore mentioned disadvantages, I provide a potentiometer of convenient size which is calibrated to read temperatures directly.

Figure 1:
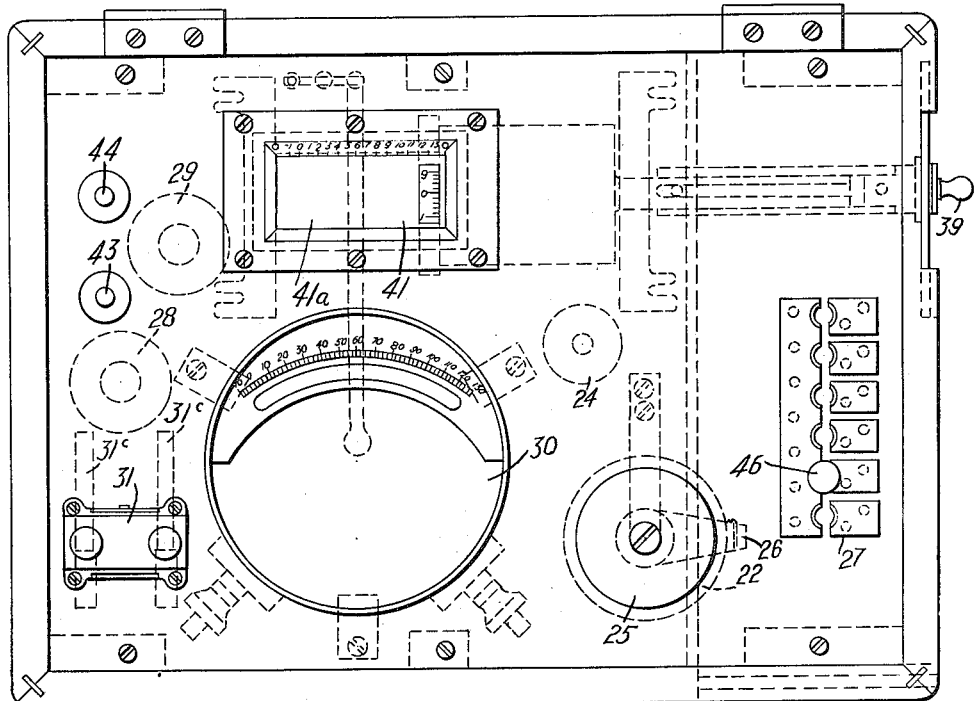
Figure 2:
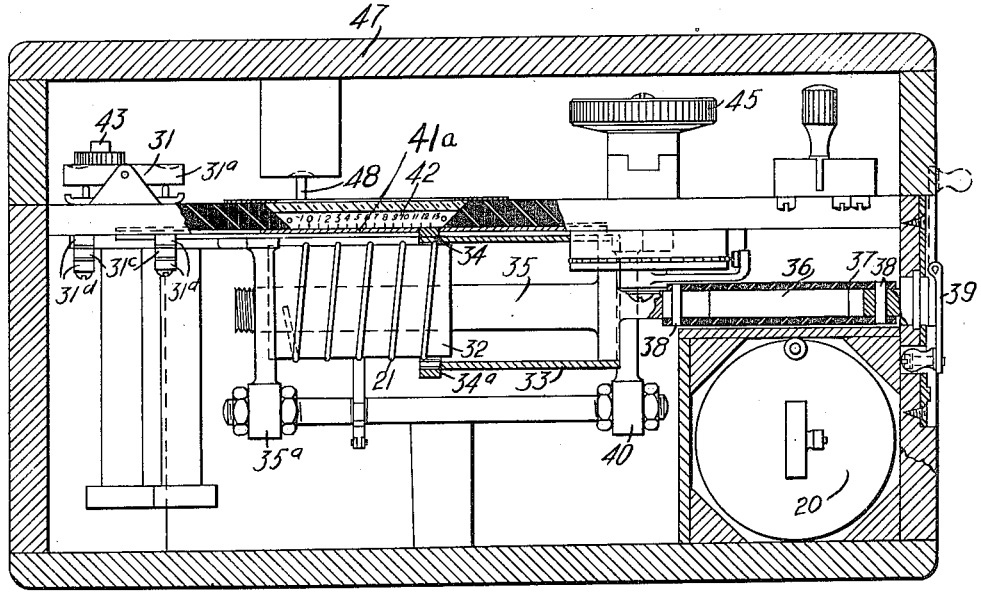
Figure 3:
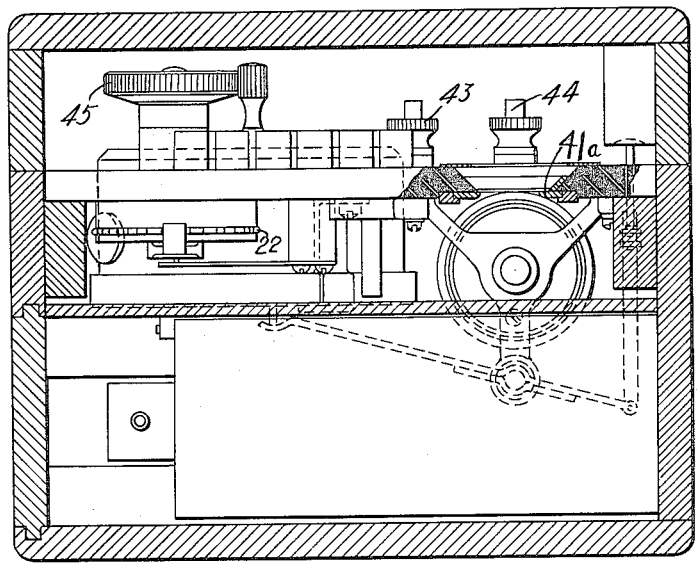
Figure 4:
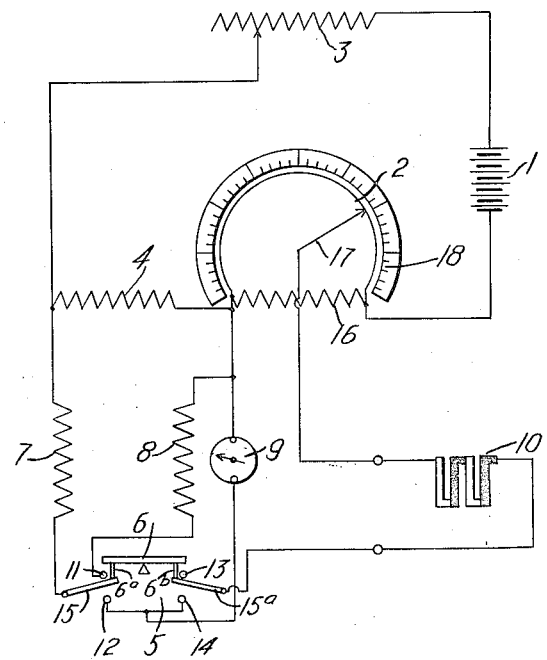

Figure 1 of the accompanying drawings is a plan view of a potentiometer embodying my invention. Fig. 2 is a rear view, partially in elevation and partially in section, of the potentiometer shown in Fig. 1. Fig. 3 is an end view, partially in elevation and partially in section, of the potentiometer shown in Figs. 1 and 2, and Fig. 4 is a diagrammatic view of circuits and apparatus embodying my invention.

Referring to the drawings, a battery 1 is connected in series relation to a calibrated variable resistor 2, a variable resistor 3 and a third resistor 4. A switch 5, having a rocker arm 6, is so arranged and connected that a resistor 7 may be connected in series either with a resistor 8 or a galvanometer 9. Either of these circuits so formed may be connected in shunt relation to the resistor 4, or a circuit comprising a thermo-electric generator 10 and the galvanometer 9 may be connected in shunt relation to a whole or a part of the resistor 2, while the resistors 7 and 8 are in series, forming a circuit in shunt relation to the resistor 4. The rocker arm 6, which is usually an insulator, has a projection 6ª extending laterally therefrom at one end and a projection 6ᵇ at the other end. Four contact terminals 11, 12, 13 and 14 are provided, and two resilient contact members 15 and 15ª are disposed between the members 11 and 12 and 13 and 14, respectively. The contact member 15ª is disengaged from the idle contact terminal or stop 13 when the rocker arm is depressed on the end provided with the projection 6ᵇ and engagement is effected with the contact terminal 14 while the contact member 15 and the contact terminal 11 remain in effective engagement. If the rocker arm is released, the contact member 15ª and the contact terminal 14 are disengaged. If the rocker arm is depressed on the other end, engagement is effected between the contact member 15 and the contact terminal 12, and disengagement is effected between the contact member 15 and the terminal member 11, for purposes hereinbefore stated. A resistor 16 may be connected in shunt relation to the resistor 2 for calibration purposes or for the purpose of extending the range of the instrument. A contact member 17 is arranged for engaging the resistor 2 and for indicating the readings of the instrument in conjunction with the calibrated scale 18 of the same.

The rocker arm 6 of the switch 5 is depressed so that engagement is effected between the contact member 15 and the contact terminal 12, thus completing a circuit in shunt relation to the resistor 4 comprising the galvanometer 9 and the resistor 7, for measuring the voltage drop across the resistor 4 which is proportional to the current flowing from the battery 1. The resistor 3 is adjusted until the galvanometer 9 reads the microvolts per degree rise of the thermo electric generator 10. The rocker arm 6 of the switch 5 is depressed on the other end until contact is effected between the contact member 15ª and the contact terminal 14, to thus connect the thermo-electric generator 10 and the galvanometer 9 in shunt relation to the resistor 2, as hereinbefore described. The contact member 17 is adjusted until no current flows through the galvanometer 9; thus, the circuit is balanced and the indicator 17 indicates, in conjunction with the scale 18, the temperature to which the thermo-electric generator has been subjected. As hereinbefore stated, the thermo-electric generator 10 has such characteristics that its thermo electromotive force is proportional to its rise in temperature and is usually called a straight line thermo-electric generator. It is understood by those versed in the art that the temperature referred to is the difference in temperature between the hot and cold junctions of the thermo-electric generator.

The resistance of the galvanometer 9 and that of the resistor 8 are substantially equal, so that the circuits are always in the same proportion, irrespective of the circuit in which the galvanometer is connected. Since the galvanometer 9 is used both as an indicating and as a null instrument, the use of a standard cell is not necessary when calibrating the potentiometer, if the characteristics of the thermo-electric generator 10 are known.

Referring now particularly to the Figs. 1, 2 and 3 of the drawings, my invention is contained in a box 19 and comprises a battery 20, a calibrated resistor 21, a variable resistor 22 and a third resistor 24. The resistor 22 is helical in shape and is disposed upon a cylinder 25 and engagement is effected therewith by a movable contact arm 26. The resistor 22 has an auxiliary resistor in series therewith which is wound on spools and divided into small steps by a plug board 27, in the usual manner. A resistor 28 and a resistor 29 are also provided, which are wound upon spools and correspond respectively to the resistors 7 and 8, as shown in Fig. 4. A galvanometer 30 and a rocker switch 31, are also provided. The rocker switch 31 comprises a rocker arm 31$^a$ having two lateral projections which severally actuate resilient contact members 31$^c$ to effect engagement with a plurality of contact terminals 31$^d$. The resistor 21 is wound upon a cylinder 32, and a cylindrical member 33, having a ring 34 on its end, is slidably fitted over the cylinder 32. A contact member 34$^a$ is provided in the ring 34 for engaging the turns of the resistor 21. The cylindrical member 33 has a centrally disposed rod 35 that is screw threaded at one end, with the same, or approximately the same, pitch as the turns of the resistor 21. A standard 35$^a$ is internally screw threaded to receive the rod 35 and thus prevent its lateral movement. A bifurcated member 36 is attached to the outer end of the cylindrical member 33, and a second cylindrical member 37, having a plurality of pins 38 therein, is disposed around the same, and the pins are inserted between the arms which are spaced apart. The cylindrical member 37 is journaled at one end in the case 19 and has a handle 39 for rotating it and the cylinder 33 positively. The member 36 is rotatably mounted in a support 40 for structural reasons. A window 41, that is graduated, preferably in degrees of temperature, is provided with a shutter 41$^a$ having a slit therein. The outer edge of the ring member 34 is inserted in this slit and is provided with a scale that, when the cylindrical member 33 is rotated, the ring member 34, coöperates with the scale 42 that is marked on the side of the window 41 to indicate the temperature rise. The shutter 41$^a$ is provided for keeping the dust from the instrument and as a vernier member, as is understood by those versed in the art. The thermo-electric generator that is subjected to the temperature to be measured is connected to the device by the binding posts 43 and 44 provided for that purpose. The rocker switch 31 is connected substantially as is the switch 5, shown diagrammatically in Fig. 4, in order that, when it is depressed on one side, the galvanometer 30 is connected in circuit with the resistor 28, when it is released, the resistor 29 is connected in circuit with the resistor 28 and, when it is depressed on the other side, the thermo-electric generator is connected in circuit with the galvanometer 30, and the resistors 28 and 29 remain in series relation, as hereinbefore described.

The switch 31 is so thrown that current traverse the resistor 28 and the galvanometer 30 in series; next, the resistor 22 is varied by turning the handle 45 and by varying the position of the plug 46 in the plug board 27 until the galvanometer 30 indicates the micro-volts per degree rise of the particular thermo-electric generator being used. The switch 31 is depressed in the opposite direction and the handle 39 turned until the galvanometer 30 reads zero. The reading of the ring member 34 on the scale 42 will indicate the temperature rise. While it is preferable to have the scale 42 graduated in degrees of temperature, it may be graduated in micro-volts, and a calibration curve supplied.

The box 19 has a cover 47 which engages a lever 48 when it is depressed, thus lifting the movable element (not shown) of the galvanometer 30 from its seat, when the instrument is not in use.

Of course, my invention is neither limited to the particular construction illustrated nor to temperature measurements exclusively, but is capable of various modifications within the scope of the appended claims.

I claim as my invention:

1. In a measuring instrument, the combination in a circuit comprising a source of electromotive force and a plurality of resistors connected in series relation, of a resistor, an electrical indicating device, a thermo-electric generator and means for alternately connecting the said resistor and the said indicating device in shunt relation to one resistor of the said circuit and for connecting the thermo-electric generator in shunt relation to another of the said resistors in the said circuit and in series relation to the said electrical indicating device.

2. In a measuring instrument, the combination in a circuit comprising a source of electromotive force and a plurality of resistors connected in series relation, of a resistor, an electrical indicating device and means for alternately connecting the said resistor and the indicating device in shunt relation to one resistor of the said circuit, a thermo-electric generator connected in shunt relation to another of the said resistors in the said circuit and in series relation to the said electrical indicating device, said means for connecting the resistor and the indicating device in shunt relation to the said resistor being adapted to disconnect the said indicating device from the said resistor when the said thermo electric generator is connected in shunt relation to the other of the said resistors.

3. In a measuring instrument, the combination with a potentiometer conductor, a resistor, a galvanometer and a thermo-electric generator, of a switch for connecting the thermo-electric generator in series with the galvanometer, the partial circuit thus constituted in shunt relation to the potentiometer conductor and the resistor in shunt relation to the potentiometer conductor.

4. A potentiometer comprising a casing, a face plate disposed within the casing and having an opening therein and a scale marked along the edge of the opening, a stationary cylindrical member disposed adjacent the opening in the face plate, a potentiometer conductor wound on the cylindrical member, a rotatable cylindrical member adapted to surround the potentiometer conductor and to make contact therewith, and a shutter for the opening in the face plate having an opening therein, said rotatable cylindrical member having a projection thereon adapted to register with the opening in the shutter for actuating the same and for coöperating with the scale.

5. A potentiometer comprising a casing, a face plate disposed within the casing and having an opening therein and a scale marked along the edge of the opening, a stationary cylindrical member disposed adjacent the opening in the face plate, a potentiometer conductor wound on the cylindrical member, a rotatable cylindrical member adapted to surround the potentiometer conductor, means for causing the rotatable cylindrical member to have a longitudinal movement when rotated to engage any point on the potentiometer conductor, and a shutter for the opening in the face plate having an opening therein, said rotatable cylindrical member having a flange thereon for coöperating with the opening in the shutter for actuating the same and for coöperating with the scale to indicate the position of the rotatable cylindrical member.

6. A measuring device comprising a potentiometer conductor, a resistor, a galvanometer, a thermo-electric generator and means for alternately connecting the said resistor and the said galvanometer in shunt relation to the said potentiometer conductor and for connecting the said galvanometer in series with the thermo-electric generator and the partial circuit thus constituted in shunt relation to the said potentiometer conductor.

7. In a measuring instrument, the combination with a potentiometer conductor, a resistor, a galvanometer and a thermo-electric generator, of means for connecting either the resistor or the galvanometer in shunt relation to the potentiometer conductor and for connecting the thermo-electric generator in series with the galvanometer when the resistor is connected in shunt relation to the potentiometer conductor.

8. In a measuring instrument, the combination with a potentiometer conductor, a resistor, a galvanometer and a thermo-electric generator, of a switch comprising means for connecting the thermo-electric generator in series with the galvanometer and the partial circuit thus constituted in shunt relation to the potentiometer conductor under predetermined conditions.

9. In a measuring instrument, the combination with a potentiometer conductor, a resistor, a galvanometer and a thermo-electric generator, of a switch comprising means for alternately connecting the resistor and the galvanometer in shunt relation to the potentiometer conductor and for connecting the galvanometer in series with the thermo-electric generator only when the resistor is connected in shunt relation to the potentiometer conductor.

In testimony whereof, I have hereunto subscribed my name this 27th day of Mar., 1914.

LEWIS W. CHUBB.

Witnesses:
O. W. A. OETTING,
B. B. HINES.